United States Patent

[11] 3,559,520

[72] Inventors John G. Postins
Wednesbury;
Stanley R. Prottey, Jubilee Estate, Cannock, England
[21] Appl. No. 774,275
[22] Filed Nov. 8, 1968
[45] Patented Feb. 2, 1971
[73] Assignee Midland Industries Limited
Stafford, England
a British company

[54] SAWING AND OTHER LIKE CUTTING MACHINES FOR OPERATING ON MOVING BAR OR OTHER STOCK
10 Claims, 5 Drawing Figs.

[52] U.S. Cl. .................................................. 83/292, 83/294
[51] Int. Cl. .................................................. B23d 25/16
[50] Field of Search.......................................... 83/290, 291, 292, 294, 319

[56] References Cited
UNITED STATES PATENTS

| 1,648,829 | 11/1927 | Sessions ...................... | 83/294 |
| 2,163,967 | 6/1939 | Strawn et al. ................. | 83/292 |
| 2,287,833 | 6/1942 | Ridgway........................ | 83/292 |
| 2,757,734 | 8/1956 | Richardson ................... | 83/292 |
| 3,081,657 | 3/1963 | Harris............................ | 83/294 |
| 3,267,783 | 8/1966 | Kepes............................ | 83/292X |

Primary Examiner—Frank T. Yost
Attorney—A. Yates Dowell

ABSTRACT: A flying saw machine having a control means for causing a main fluid pressure operated piston and cylinder device to advance substantially in unison with a carriage clamped to and having a cutting tool to cut through the advancing bar stock and be withdrawn therefrom whereupon the clamps release the carriage from the bar stock and said device returns the carriage and cutting tool to a starting position.

PATENTED FEB 2 1971

INVENTORS
JOHN G. POSTINS &
STANLEY R. PROTTEY

BY [signature]
ATTORNEYS

SAWING AND OTHER LIKE CUTTING MACHINES FOR OPERATING ON MOVING BAR OR OTHER STOCK

SUMMARY OF THE INVENTION

According to the present invention a flying cutting tool machine is provided for cutting substantially horizontally advancing bar stock and having a carriage with clamping means by which the carriage is clamped to the bar stock at a starting position and also having a cutting tool movable to cut through the advancing bar stock and be withdrawn therefrom whereupon the clamping means release the carriage from the bar stock to enable a main fluid pressure operated piston and cylinder device, which is not attached rigidly to the carriage and does not influence the advance movement of the carriage, to return the carriage to the starting position wherein is the improvement that a control means is associated with the carriage and with a movable member of the main fluid pressure device to cause said movable member of the main fluid pressure device to be advanced by fluid pressure therein substantially in unison with the carriage whilst the clamps secure the said carriage to the stock so as to be advanced solely by the stock until the cutting tool has finished a cutting operation and is clear of the bar stock and then to cause said movable member of the said main fluid pressure device substantially simultaneously to return the carriage to the starting position.

BRIEF DESCRIPTION OF THE DRAWINGS

A flying saw machine constructed in accordance with the present invention will now be more particularly described by way of example with reference to the accompanying drawings in which.

DESCRIPTION OF THE PREFERRED EMBODIMENT

Figure 1:
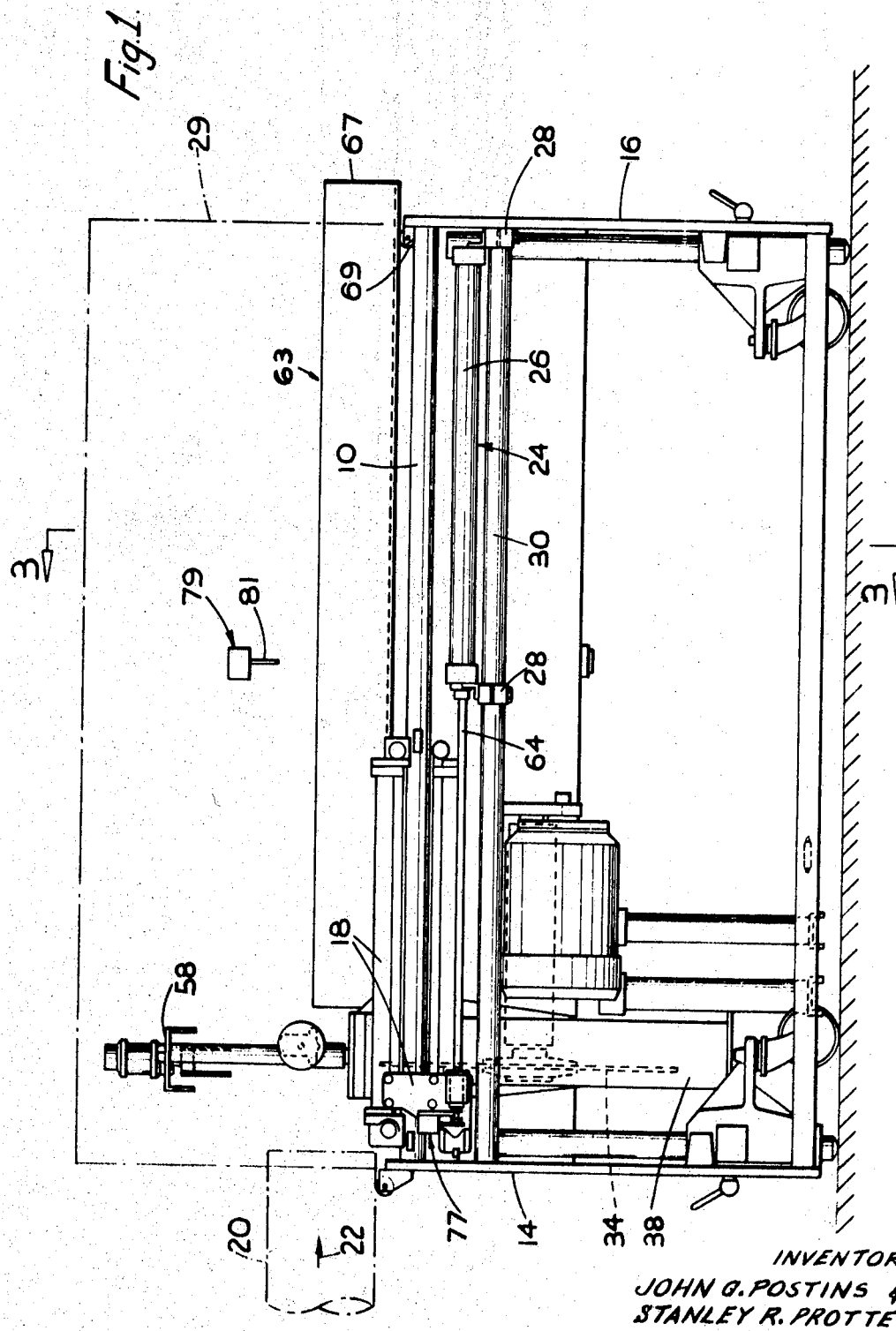
FIG. 1 is a side view of the machine with parts removed for clarity.
Figure 2:
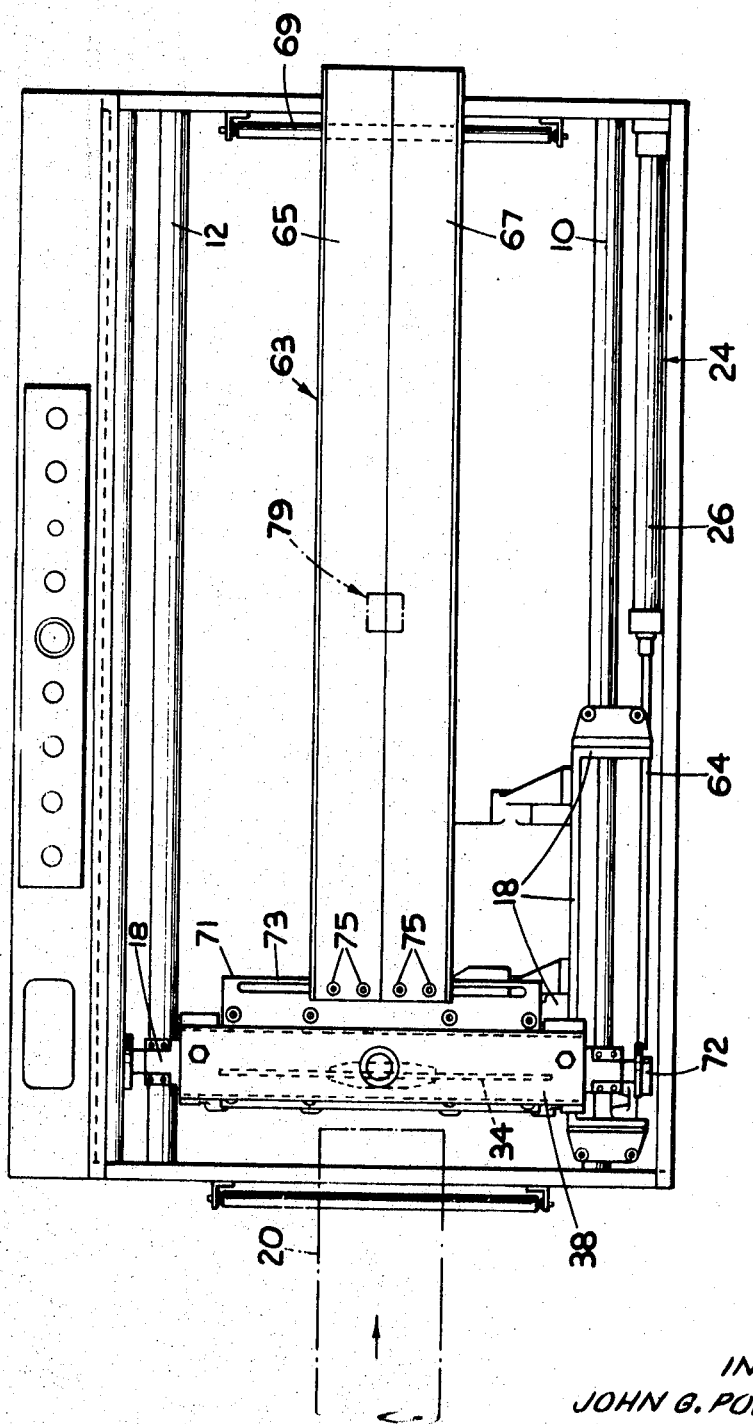
FIG. 2 is a plan view of FIG. 1.

The flying saw machine comprises a stationary frame including two horizontal rails 10, 12 disposed one at each side of the machine and extending in a direction from an intake end 14 to a discharge end 16 and on the rails is supported a carriage 18 which is thus capable of being advanced and returned in a horizontal plane and in directions from end-to-end of the machine and the arrangement is such that the carriage is advanced by being clamped to a continuously advancing circular tubular bar or stock 20, advancing in the direction of the arrow 22, to be cut into predetermined lengths or cutoff portions, and is returned to a starting position shown in FIGS. 1 and 2 by a main fluid pressure operating piston and cylinder device 24 of which the cylinder 26 is mounted on brackets 28 clamped to a horizontal support rail 30.

A removable cover is indicated in dotted lines at 29.

The carriage 18 has pivotally mounted thereto at 31 about a horizontal axis extending from end-to-end and thus longitudinally of the machine, an arm 32 at the outer end of which is carried a cutting tool in the form of a rotatable saw 34 which rotates about a horizontal axis disposed longitudinally of the machine and the saw is disposed in general below the path along which the stock 20 is advanced and is fed upwardly to effect a cutting action by means of a feed fluid pressure operated piston and cylinder device 36 connected to the free end of the arm and to the carriage. The saw is driven by an electric motor 37 also mounted on the arm 32.

Figure 3:
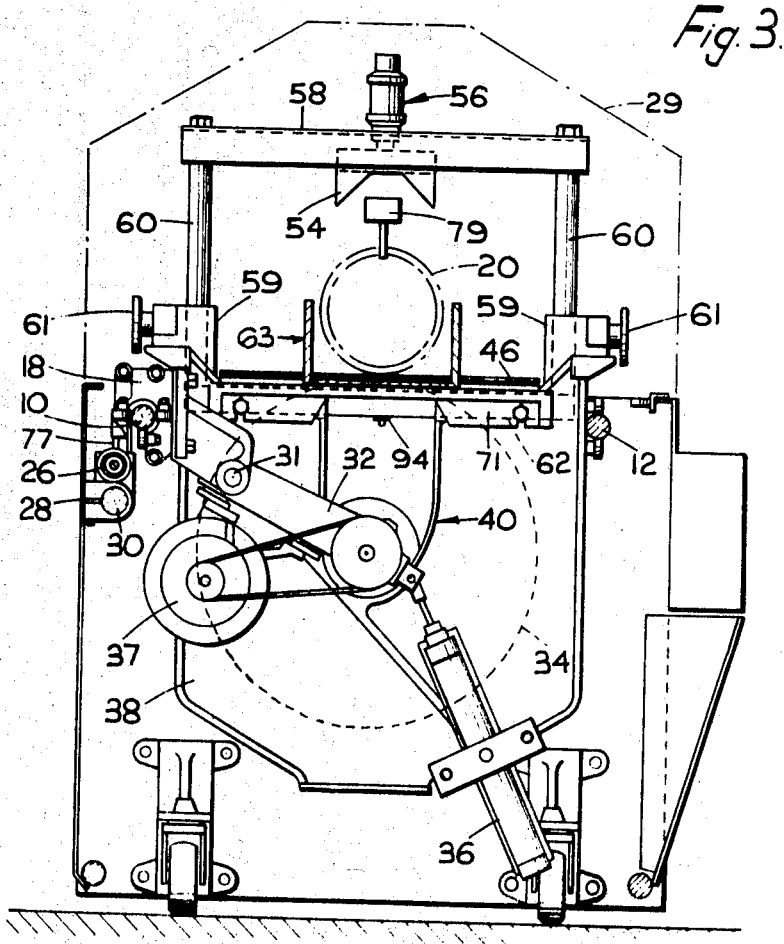
FIG. 3 is a sectional view of FIG. 1 on the lines 3-3 thereof.
Figure 5:
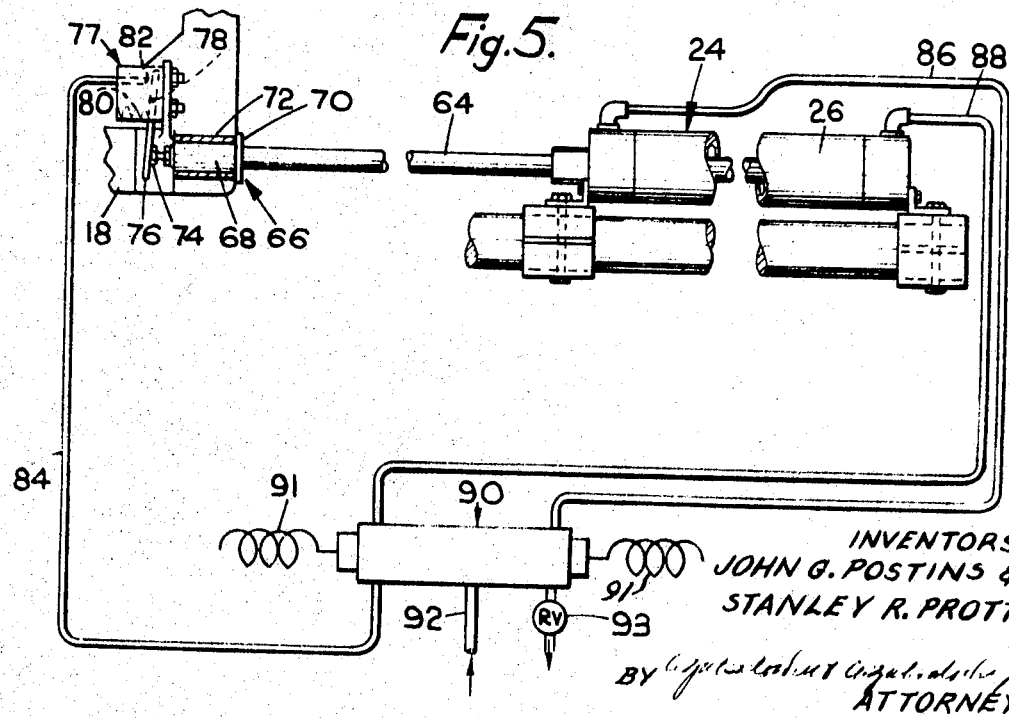
FIG. 5 is a diagrammatic view.

The saw 34 is, in main, enclosed within a box formation 38 of the carriage and the box formation is provided with a substantially upright slot 40 in which a bearing sleeve 42 of the arm moves. In the lowermost position of the saw, as shown in FIG. 3, the upper edge thereof is disposed slightly below a lower clamp comprising two barlike jaws 44, 46 see FIG. 4, secured to the carriage 18 and said jaws are disposed transversely of the machine and are spaced apart on opposite sides of the saw 34 so that the lower clamp is divided and affords a slot or gap 48 between which the saw can be fed upwardly and returned downwardly and the two jaws are positioned as closely as possible to the sides of the saw so as to be just clear of the saw. The upper faces of the jaws 44, 46 are horizontally disposed and are formed of strip rubber or like material supported on metal backing bars 50.

Figure 4:
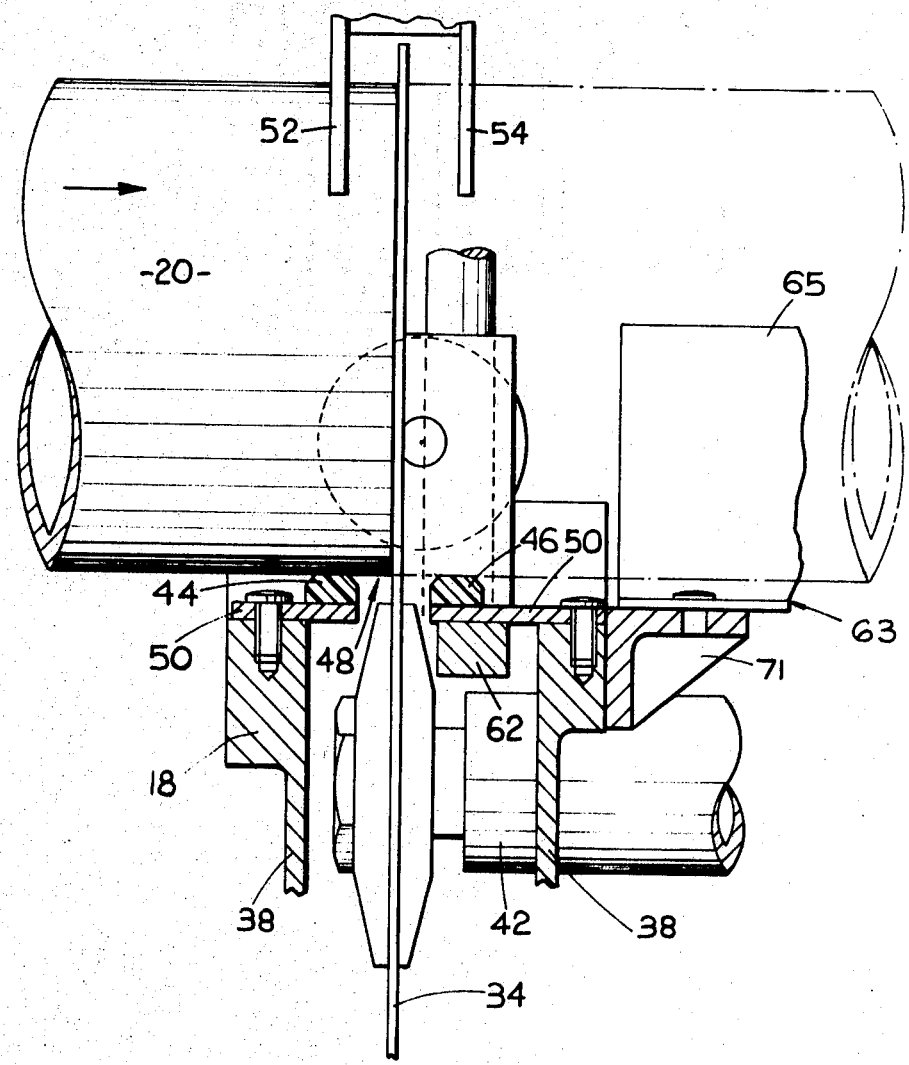
FIG. 4 is a fragmentary sectional view of a part shown in FIG. 1.

Cooperating with the lower divided clamp 44, 46 is an upper divided clamp which is of inverted V-formation in end elevation as shown in FIG. 3 so as to locate the circular bar stock 20 when the stock is gripped between the upper and lower clamps and said upper clamp comprises two jaws 52, 54 which are spaced apart to lie on opposite sides of the saw and as closely as possible to the saw so as to be just clear of the saw and so that the gap between the jaws can receive the saw at the end of the cutting operation as shown in FIG. 4. The upper clamp may be made of metal, fibre or other suitable material and if desired the lower faces of the jaws may be faced with rubber or like material. The jaws may be of various shapes in end elevation so as to be complementary to the profile of the stock being cut.

The upper and lower clamps thus provide two cooperative pairs of jaws, one pair of jaws 44, 52 being on the advancing stock side of the saw to grip the leading end of the stock and the other pair of jaws 46, 54 being on the cutoff portion side of the saw and each pair of cooperative jaws are coplanar in a vertical plane so that the leading end of the stock is clamped to the carriage by the pair of a jaws 44, 52 and also the trailing end of the cutoff portion is clamped to the carriage by the pair of jaws 46, 54 during the entire cutting action so that said cutoff portion is advanced by the carriage during the entire cutting action and not by the saw and the saw does not score the trailing end of the cutoff portion unduly as occurs in previous machines in which the cutoff portion is advanced by the saw and furthermore at the instant at which the complete severance is effected between the stock and the cutoff portion both said stock and cutoff portion are clamped securely in position so that the final cutting action is clean and avoids the formation of pips or flash on the leading and ta trailing ends of the stock and cutoff portion respectively.

The upper clamp 52, 54 is carried at the lower end of a piston rod of a clamp fluid pressure operated piston and cylinder device 56 of which the cylinder is vertically disposed and is carried by a horizontal upper crossbar 58 at a position between the ends of the crossbar which is disposed transversely of the machine and forms a part of a pillar structure of the carriage.

The pillar structure also comprises two vertical pillars 60 disposed at opposite sides of the carriage as shown in FIG. 3 and the upper crossbar 58 connects together the upper ends of the pillars of which the lower ends are connected together by a lower horizontal crossbar 62 disposed below a backing bar 50. The pillars 60 are slidably supported in bushes 59 forming parts of the carriage and screw clamping means are carried by the bushes and are operable by manually rotatable knobs 61 to clamp the pillar structure to the carriage. The clamps can be released to enable the pillar structure to be adjusted vertically, to afford a coarse adjustment of the upper clamp to accommodate stock of different sizes after which the screw clamping means are tightened. The actual vertical clamping movement effected by the upper clamp is performed by the clamping fluid, preferably air, operated device 56 and extends over a small or fine range of movement such as, for example, approximately 1 inch.

Secured to the carriage 18 is a table 63 which is disposed on the cutoff portion side of the saw 34 and said table comprises two bars 65, 67 of angle section which are supported at one end by a roller 69 and at the other end by a bracket 71 secured to the carriage. The bracket has a slot 73 through which clamping bolts 75 pass to enable the width of the table to be varied to suit different sizes of bar stock.

Above the table there is supported in a stationary manner an electrical length control switch 79 which includes a depending pivoted finger 81 which lies in the path of advance of the leading end of a portion of the bar stock being cut and said leading end is spaced above the table so as not to be supported thereby, said portion being supported whilst being cut by the jaws 46, 54. The switch 79 is suitably connected by connections in a circuit (not shown)

The main fluid, preferably air, operated piston and cylinder device 24 comprises the cylinder 26 which is disposed longitudinally of the machine at one side thereof and a piston rod member 64 of the device extends from the cylinder towards that end of the machine at which the stock enters the machine and at the end of the piston rod there is secured an operating button 66 having a cylindrical shank 68 formed at that end adjacent the cylinder with an annular shoulder 70 and the shank is slidably housed in a cylindrical bush 72 secured to the carriage 18 and the annular shoulder can abut one end of the bush to return the carriage to a starting position after the carriage has been advanced as a result of being clamped to the advancing stock in a manner as previously described. The end of the operating button includes an adjustable set screw 74 which cooperates with an actuating lever 76 of a followup fluid pressure release valve 77 carried by the carriage, and which actuating lever is pivoted at 78 and is urged by a spring 80 in a direction to resist movement of said lever by the operating button 66. The followup valve is shown diagrammatically as comprising a port 82 at the end of a pipe 84 and the actuating lever cooperates with the port to open and close the valve and when the annular shoulder 70 abuts the end of the bush 72 the operating button opens the followup valve which is allowed to close when the operating button is not in contact with the actuating lever and the annular shoulder of the operating button is not in contact with the end of the bush.

The main fluid pressure device 24 is double-acting and the two opposite ends of the cylinder are connected by pipes 86, 88 to a multiway valve which is diagrammatically illustrated at 90 and which valve is operated or controlled by solenoids indicated at 91 in circuit with one or more electrical microswitches (not shown) arranged to be automatically actuated to obtain a repeating cycle of the machine. The multiway valve 90 is connected by a pipe 92 to a main air pressure supply source and is also connected by the pipe 84 to the followup valve 77 so that the large pressure side of the piston, i.e. not containing the piston rod 64, can be connected to the followup valve so that the said larger side of the piston can be opened to exhaust when the actuating lever of the followup valve is moved into an open position against spring action by the operating button 66 at the end of the piston rod, and said multiway valve is also connected to an adjustable relief valve 93 which can be connected through said multiway valve to the small pressure side of the piston, i.e. that side in which the piston rod is disposed.

The cycle of operations of the machine is as follows:

The bar stock 20 is continuously advancing in the direction of the arrow 22 FIG. 1.

For convenience the cycle is considered to commence at the position in which air pressure is on both sides of the piston of the main device 24 but the large side of the piston is connected through the pipe 88 to the main supply 92 whereas the small side is connected through the pipe 86 to the relief valve 93 and thus to restricted exhaust so that the piston and thus the carriage 18, on which the clamps 44, 46, 52 and 54 are opened free of the stock 20, are returned to a starting position as shown in FIGS. 1 and 2 against the action of a maintained air pressure on the small side of the piston and which maintained pressure depends on the setting of the relief valve 93 and prevents the carriage 18 being shot back to the starting position and this starting position of the carriage is held by the main device.

The constantly advancing bar stock then operates the electrical length control switch 79 (or alternatively a manually operable start switch can be actuated) whereby a signal is transmitted to the multiway valve 90 to connect the small side of the piston of the device 24 to the main air pressure supply 92 and cut off said small side from the relief valve 93 and to open the large side of the piston to exhaust through the now open followup valve 77 and also to cause the clamps 44, 46, 52 and 54 on the carriage 18 to secure the carriage to the stock.

As the followup valve 77 is open the piston in the main device 24 is advanced by the larger air pressure on said small side of the piston so that the piston rod 64 and the operating button 66 at the end thereof advance relatively to the bush 72 on the carriage 18 and thus away from the actuating lever 76 of the followup valve 77 to allow the lever to be spring urged into a position closing said valve to stop the exhaust from the large side of the piston and thus to stop the advance of the piston rod. Simultaneously as the clamps have secured the carriage to the stock, the carriage 18 and thus the bush 72 also advance slightly behind the operating button 66 and as the operating button is stationary the followup valve 77 and thus the carriage catch up with the operating button 66 so that the actuating lever 76 of the followup valve 77 is moved against spring action from a valve-closed position to a valve-open position. As the followup valve is now open the larger side of the piston is again open to exhaust the piston is again advanced away from the carriage a small distance to allow the followup valve again to close whereupon the carriage again catches up with the operating button.

Thus the piston of the main device 24 advances in what is apparently a step-by-step manner slightly in front of the carriage but in practice the piston advances fairly steadily and thus said main device advances in unison or substantially in unison with the carriage and never advances a substantial distance in front of the carriage.

At the commencement of the movement of the carriage 18 by the stock 20 from the starting position a further electrical switch (not shown) is operated to start rotation of the saw 34 but this only occurs for relatively long cutoff portions of stock and for relatively short cutoff portions of stock the saw will be allowed to rotate continuously. A further electrical switch (not shown) is also operated to cause the device 36 to effect a feed movement of the saw upwardly but this further switch is shunted when relatively short cutoff portions are being produced and when the saw is rotating continuously and said feed movement is otherwise obtained.

The saw continues to move upwardly to effect a cutting operation whilst the carriage continues to advance steadily and whilst the main device 24 is either level with or slightly ahead of the carriage.

At the end of the upward feed movement of the saw, the arm 32 carrying the saw 34 cooperates with an electrical switch 94 carried by the lower crossbar 62 to actuate a further multiway valve (not shown) and reverse the feed movement of the saw and thus cause the saw to move downwardly but if an overrun upward movement of the saw occurs, the upwardly moving arm 32 abuts the crossbar whereby a positive safety stopping action is provided. As previously described during the feed movement of the saw the stock is cut cleanly without undue score marks and without pips or flash remaining at the ends of the cutoff portions and during the cutting operation the portion of stock being cut off is advanced solely by the clamps and not by the saw.

In addition to the last mentioned electrical switch 94 two further electrical switches (not shown) are provided and the three switches are arranged in series and of the said two further switches one is manually operable in case of emergency to stop the cutting action and the other switch ensures that the saw blade is returned to the bottom position before the carriage reaches the end of its mechanical travel, i.e. the maximum distance of travel of the carriage, which is fixed by the size of the machine, so that if by accident the carriage 18 reaches the full limit of its travel, the two switches ensure that the saw is returned to the bottom position and thus under any circumstances the saw, when within the stock, cannot slow down, pause or move in the opposite direction relative to the stock.

When the saw attains its lowermost position another electrical switch or switches (not shown) is or are operated to cause the clamps to open whereby the carriage is freed from the advancing stock and the multiway valve 90 is actuated to connect the mains air supply 92 to the large side of the piston of the main device 24 to return the carriage to the starting position during which return movement the air from the small side of the piston is exhausted through the relief valve 93 set at a predetermined pressure and this return movement of the carriage is effected by the annular shoulder 70 of the operating button abutting the adjacent end of the bush 72. The starting position of the carriage is maintained by the main fluid pressure operated piston and cylinder device 24 until the cycle of operations is automatically recommenced.

It should be appreciated that the portion of the stock bar 20 being cut is supported above the table 65, 67 solely by the jaws 46, 54 and that the table only supports the cutoff portion, i.e. after complete severance has occurred.

The arrangement is such that individual operations of the machine can be tested without performing the full cycle of operations.

The multiway valve 90, followup valve 77, relief valve 93 and associated pipe lines, electrical switches and connections thus constitute a control means which is associated with and controls the main device 24 and the carriage 18 and as a result of the main device remaining at all times level with or only slightly in advance of the carriage said device only moves through a distance proportional to the length of the cutoff portions required and does not move through the entire stroke of the device unless the length of the cutoff portion requires this and, therefore, the device in the machine according to the present invention does not have to move through a "waste" distance during which the stock is advancing and in consequence the machine can cut off shorter portions of stock than would be possible with known machines of similar sizes. Also, due to the fact that the cutoff portion is advanced by the clamps and not by the saw a more efficient and clean cutting operation is achieved which results in the cutoff portions being accurate in length.

We claim:

1. A flying cutting tool machine for cutting substantially horizontally advancing bar stock (20) and having a carriage (18) with clamping means (44, 52, 46, 54) by which the carriage is clamped to the bar stock at a starting position and also having a cutting tool (34) movable to cut through the advancing bar stock and be withdrawn therefrom whereupon the clamping means release the carriage from the bar stock to enable a main fluid pressure operated piston and cylinder device, which is not attached rigidly to the carriage and does not influence the advance movement of the carriage, to return the carriage to the starting position wherein is the improvement that a control means (90, 77, 93) is associated with the carriage (18) and with a movable member (64) of the main fluid pressure device (24) to cause said movable member (64) of the main fluid pressure device (24) to be advanced by fluid pressure therein substantially in unison with the carriage (18) whilst the clamps secure the said carriage to the stock so as to be advanced solely by the stock until the cutting tool (34) has finished a cutting operation and is clear of the bar stock (20) and then to cause said movable member (64) of the said main fluid pressure device (24) substantially simultaneously to return the carriage (18) to the starting position.

2. A flying cutting tool machine for cutting substantially horizontally advancing bar stock (20) and having a carriage (18) with clamping means (44, 52, 46, 54) by which the carriage is clamped to the bar stock at a starting position and also having a cutting tool (34) movable to cut through the advancing bar stock and be withdrawn therefrom whereupon the clamping means release the carriage from the bar stock to enable a main fluid pressure operated piston and cylinder device, which is not attached rigidly to the carriage and does not influence the advance movement of the carriage, to return the carriage to the starting position wherein is the improvement that a control means comprises a multiway fluid pressure valve (90) and a followup fluid pressure release valve (77), said multiway valve being connected to a fluid pressure supply source (92) and to opposite ends of the main fluid pressure piston and cylinder device (24) which is double-acting and said multiway valve being also connected to the followup valve (77) which is supported by and movable with the carriage (18) and which followup valve (77) is operably associated with the movable member (64) of said main device (24) whereby during advance of the carriage (18) by the bar stock from the starting position the followup valve (77) catches said movable member (64) of the main device (24) to open said followup valve (77) and open one side of the said main device (24) to exhaust to permit a greater fluid pressure on the other side of said main device (24) to advance said movable member (64) of said device away from the followup valve (77) which will then close to stop further advance of the said movable member (64) of said main device (24) until the carriage (18) and the followup valve (77) again catch the said movable member (64) of said main device to repeat the cycle until the tool (34) has finished the cutting operation and is clear of the stock (20) from which the carriage (18) is then released whereupon the multiway valve (90) connects said one side of the main device to the fluid pressure supply (92) and the other side of said main device to exhaust to reverse the operation of the said main device (24) and return the carriage (18) to the starting position.

3. A flying cutting tool machine according to claim 2 wherein is the improvement that said other side of the said main device (24) is connected to exhaust through a pressure relief valve (93).

4. A flying cutting tool machine according to claim 2 wherein is the improvement that the followup fluid pressure release valve (77) comprises a port (82) connected to the multiway valve (90), an actuating lever (76), a spring (80) to urge the lever towards the port to close said valve, said lever cooperating with an operating button (66) of said movable member (64) of the main device (24) whereby the lever is urged away from the port to open said valve.

5. A flying cutting tool machine according to claim 4 wherein is the improvement that the carriage (18) is provided with an abutment (72) and the operating button (66) is provided with an abutment (70) and said abutments cooperate to enable the main device (24) to return the carriage (18) to the starting position and said abutments separate when the operating button (66) of the main device (24) advances away from the carriage (18).

6. A flying cutting tool machine according to claim 5 wherein the abutment on the carriage (18) is in the form of a bush (72) which receives a part of the operating button (66) and the abutment (70) is provided by a flange.

7. A flying cutting tool machine according to claim 2 wherein is the improvement that the cutting tool (34) is arranged to be fed upwardly to effect a cutting operation on the stock and an upper clamp (52, 54) is movable downwardly by a clamping fluid pressure piston and cylinder device (56) and is mounted on a pillar structure (60) of the carriage (18) to effect a coarse adjustment of the upper clamp to accommodate bar stock (20) of different cross-sectional sizes.

8. A flying cutting tool machine according to claim 7 wherein is the improvement that the pillar structure comprises two spaced apart pillars (60) which are supported in bushes (59) on the carriage and are vertically adjustable therein and support a crossbar (58) carrying the upper clamp (52, 54).

9. A flying cutting tool machine according to claim 8 wherein is the improvement that the pillar structure (60) comprises a further crossbar (62) which forms a positive stop for a cutting tool mounting means (32) during the feed movement of said cutting tool mounting means.

10. A flying cutting tool machine according to claim 9 wherein is the improvement that the pillar structure (60) carries a switch (94) which is in consequence adjustable with said structure (60) and is arranged to cause reversal of the feed movement of the cutting tool (34).